United States Patent [19]

Booth

[11] 4,207,187

[45] Jun. 10, 1980

[54] APPARATUS FOR FILTERING AND COOLING OIL OR OTHER FLUIDS

[76] Inventor: Robert G. Booth, 6661 Banning Dr., Oakland, Calif. 94611

[21] Appl. No.: 683,547

[22] Filed: May 5, 1976

[51] Int. Cl.² .......................................... B01D 27/10
[52] U.S. Cl. ................................... 210/130; 210/186
[58] Field of Search .............. 210/131, 181, 185, 186, 210/448, 71, 184, 130, 132; 165/178, 179, 171

[56] References Cited

U.S. PATENT DOCUMENTS

| | | | |
|---|---|---|---|
| 1,806,553 | 5/1931 | Babitch | 210/186 |
| 1,906,984 | 5/1933 | Lyman | 210/186 |
| 1,963,945 | 6/1934 | Lyman et al. | 210/186 |
| 2,145,535 | 1/1939 | Vokes | 210/131 |
| 2,468,866 | 5/1949 | Collier | 210/186 |
| 2,575,900 | 11/1951 | Vokes | 210/131 |

Primary Examiner—Theodore A. Granger

[57] ABSTRACT

A system for externally cooling and/or filtering oil involving an internally and externally finned housing enclosing a replaceable filter in flow alignment with the external cooling flow circuit of an automatic transmission or the like.

5 Claims, 3 Drawing Figures

U.S. Patent                 Jun. 10, 1980                 4,207,187
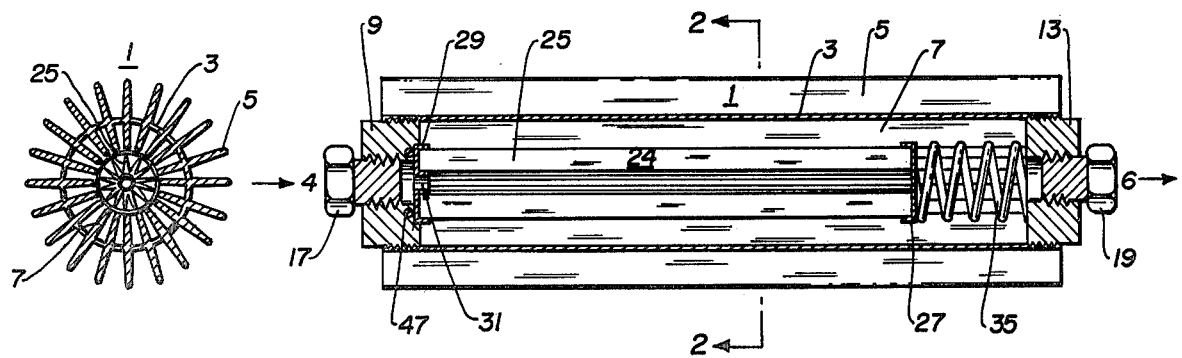
Fig. 2
Fig. 1
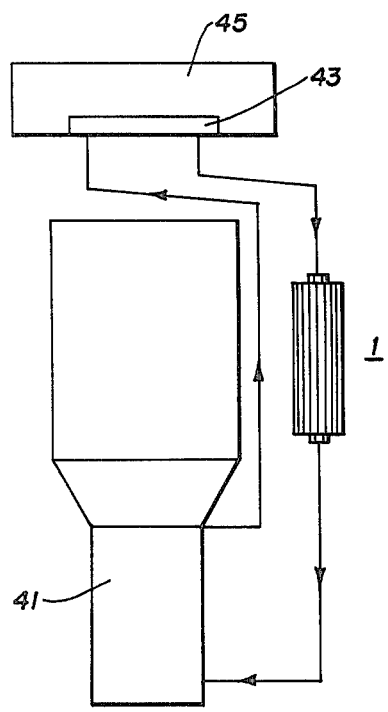
Fig. 3

APPARATUS FOR FILTERING AND COOLING OIL OR OTHER FLUIDS

The present invention relates in general to oil systems and more particularly to preserving the quality of the oil in such systems, and for disclosure purposes, will be described in its application to an automotive transmission system.

The two greatest causes of premature automatic transmission wear and failure are oil break-down and recirculation of abrasive contaminants.

The former is due to high operating temperatures to which the oil may be subjected during operation. Currently, transmissions have their lubricating oil cooled by pumping a portion through a closed external circuit which includes a small heat exchanger located at the bottom of an automobile radiator.

As radiator temperatures have been elevated considerably recently, due to the addition of smog controls to the engine, oil is now only marginally cooled under normal conditions. Climbing a long grade, exposure to high ambient temperatures, use of air conditioning, operating with out-of-tune engines, over-loading vehicles, or towing trailers will raise radiator temperatures at the very time the transmission fluid requires additional cooling, causing fluid break-down and eventual transmission failure.

The second source of failure is continual generation of contaminants due to normal transmission wear that are continously recirculated. This causes clutch band, gear, and bushing wear, which eventually results in seal leakage. Currently, such automatic transmissions use only a relatively course screen, located inside the pan, to stop large contaminants from being recirculated.

Among the objects of my invention are:

(1) To provide a novel and useful cooler for fluid systems;

(2) To provide a novel and useful filter for fluid systems;

(3) To provide a novel and useful oil cooler and filter combination for oil systems;

(4) To provide a novel and useful oil cooler and filter combination that is readily installable;

(5) To provide a novel and useful oil cooler and filter that is readily maintainable.

Additional objects of my invention will be brought out in the following description of a preferred embodiment of the same, taken in conjunction with accompanying drawings, wherein FIG. 1 is a longitudinal view in section of the cooler and filter combination of the present invention;

FIG. 2 is a sectional view in the plane 2—2 of FIG. 1;

FIG. 3 is an external cooling circuit of an automatic transmission with the invention installed therein.

Referring to the drawings for details of my invention, the same is illustrated as a combination cooler and filter assembly 1, including a outer housing 3 having an intake end 4 and an exhaust end 6, preferably of extruded aluminum, with longitudinal external fins 5 and internal longitudinal fins 7, both preferably along its entire length.

The housing includes an intake up-stream end cap 9 and an exhaust down-stream end cap 13, threaded for easy removal to provide access to the internals of the assembly for servicing. A passage through each of the end caps is internally threaded, to receive and up-stream fitting 17 in the one cap and a down-stream fitting 19 in the other, for coupling the housing into any hydraulic flow circuit as desired by a user. Hot oil flowing into the housing through the up-stream end cap fitting dissipates throughout the internal volume of the housing, contacting the relatively large surface area of the internal fins, such fins conductively transferring the heat through to the outer fins which are radiantly cooled by lower external ambient temperatures.

A filter cartridge 24 for installation, includes a filter element 25 of paper or like material, adapted to filter micro-particles, the filter element being preferably accordian pleated, and blocked at its down-stream end by a solid plate 27 of impervious material, and capped at its other or upstream end, by a plate 29 of impervious material having a central opening 31.

The cartridge is inserted into the housing with its down-stream end abutting a safety spring 35 previously placed therein, and maintained in slight pressure engagement therewith by threading the upstream end cap into position against the upstream end plate. Due to the imprevious down-stream end plate, fluid flowing into the housing is diverted laterally throughout the filtering material where micro-particles and contaminents are removed, and then into contact relationship with the internal fins where excess heat is removed. The fins 7 also function to center the cartridge.

When installed in an external cooling circuit of an automatic transmission as part of an automotive vehicle (FIG. 3), oil flow is from such transmission 41, through a heat exchanger 43 located within a radiator 45, and into the cooler-filter assembly through its upstream end. Cooled and filtered oil returns from the down-stream end of the assembly, back to the rear of the automatic transmission.

When installed as such in an automotive vehicle, and placed in a position to intercept an air stream created by movement of such vehicle, cooling performance will be greatly enhanced.

By reason of the housings large capacity relative to the connecting piping, flow is slowed along the internal fins, allowing additional contact time and therefore additional cooling time for the oil.

An "O" ring 47 may be installed between the internal surface of the upstream end cap 9 and the end plate 29 to assist in providing a leak proof seal between this end cap and the upstream end plate 29 of the filter cartridge.

Should the filter material 25 become clogged with foreign matter from transmission wear or from any other source, resulting high pressure developed against the exposed areas of the end plates will overcome sealing pressure provided by the safety spring, thus causing limited inward movement of the cartridge to open up a by-pass around the cartridge. Such by-pass provides for normal oil flow and continued cooling which will be provided even though the filter cartridge becomes clogged.

It will be noted, that variations of the invention may be used for such diversified applications as power steering pumps, dental hydro drills, aircraft aileron control pumps, farm equipment, industrial equipment and other systems where the fluid may be other than oil.

From the foregoing description of my invention in its preferred form, it will become apparent that the same is thus subject to alteration and modification, without departing from the underlying principles involved, and I do not desire to be limited in my protection to the specific details illustrated and described except as may be necessitated by the appended claims.

I claim:

1. A combined filter-cooler device for filtering and cooling fluids comprising only a single peripheral wall defining an axial chamber having a fluid intake end and a fluid discharge end, an intake end cap having an axially disposed input passageway and a discharge end cap having an axially disposed discharge passageway, a plurality of fins extending inwardly from said single peripheral wall defining boundaries of an axial space within said axial chamber in the flow path of fluid through said axial chamber, a plurality of fins extending outwardly from said peripheral wall, a filter disposed within said axial space defined by said inwardly directed fins, said filter having an intake side in flow communication with said axially disposed input passageway and a discharge side in flow communication with said axially disposed discharge passageway.

2. A filter cooler device in accordance with claim 1, characterized by said single peripheral wall, including said inwardly extending fins and said outwardly extending fins, extruded as a single structure from aluminum or other similar material.

3. A filter-cooler device in accordance with claim 1, characterized by said filter-cooler device having means responsive to build up of pressure within said filter for opening a passage around said filter to said inwardly directed fins for continued cooling in event said filter becomes clogged.

4. A filter-cooler device in accordance with claim 3, characterized by said means responsive to build up of pressure within said filter including a resilient means between said filter and said discharge end cap, whereby pressure built up within a clogged filter will urge said filter and said resilient means from said intake end cap, allowing fluid to directly enter the area around said internally directed fins, bypassing said clogged filter to maintain cooling.

5. A filter device for filtering fluids comprising only a single peripheral wall defining an axial chamber having a fluid intake end and a fluid discharge end; an intake end cap having an axially disposed input passageway and a discharge end cap having an axially disposed discharge passageway, a plurality of fins extending inwardly from said single peripheral wall defining boundaries of an axial space within said axial chamber; filter means centered and aligned within said axial space by said inwardly directed fins, said filter means having an input side in flow communication with said axial input passageway and a discharge side in flow communication with said axial discharge passageway and means responsive to buildup of pressure within said filter means for opening a passage around said filter means and through said inwardly directed fins.

* * * * *